United States Patent
Cattoor et al.

(10) Patent No.: US 11,965,590 B2
(45) Date of Patent: Apr. 23, 2024

(54) MULTI-CHANNEL ROTATIONAL SHAFT LUBRICATION SYSTEM

(71) Applicant: Dana Belgium N.V., Flanders (BE)

(72) Inventors: Kurt Cattoor, Koolkerke (BE); Joachim Van Dingenen, Drongen (BE); Filip D. Schacht, Meulebeke (BE); Jessica Versini, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 17/805,349

(22) Filed: Jun. 3, 2022

(65) Prior Publication Data

US 2023/0392682 A1 Dec. 7, 2023

(51) Int. Cl.
*F16H 57/04* (2010.01)

(52) U.S. Cl.
CPC ....... *F16H 57/043* (2013.01); *F16H 57/0436* (2013.01)

(58) Field of Classification Search
CPC ........ F16H 57/043; F16H 57/046; F16N 7/32; H02K 5/128; H02K 9/16; H02K 9/19
See application file for complete search history.

(56) References Cited

U.S. PATENT DOCUMENTS

| | | | | |
|---|---|---|---|---|
| 4,600,848 A | * | 7/1986 | Sutrina | H02K 9/19 310/211 |
| 6,471,007 B1 | * | 10/2002 | Takubo | F16N 7/32 184/50.2 |
| 6,769,391 B1 | * | 8/2004 | Lee | F02B 63/02 123/196 R |
| 9,300,189 B2 | | 3/2016 | Hautz et al. | |
| 9,735,654 B2 | | 8/2017 | Stridsberg | |
| 2015/0060207 A1 | * | 3/2015 | Nishimura | F16H 57/043 184/6.12 |

FOREIGN PATENT DOCUMENTS

WO 2021136819 A1 7/2021

* cited by examiner

*Primary Examiner* — Jake Cook
(74) *Attorney, Agent, or Firm* — McCoy Russell LLP

(57) ABSTRACT

Methods and systems for lubricating a rotating shaft are provided. The lubrication system, in one example, includes a pump coupled to a central lubricant channel, the rotating shaft having a plurality of channels, an air intake channel positioned parallel to an axis of rotation of the rotating shaft, and a first orifice of a first channel of the plurality of channels, where the first orifice is positioned between the air intake channel and the central lubricant channel.

8 Claims, 6 Drawing Sheets

MULTI-CHANNEL ROTATIONAL SHAFT LUBRICATION SYSTEM

TECHNICAL FIELD

The present description relates generally to a lubrication system for a multi-channel rotating shaft.

BACKGROUND AND SUMMARY

In driveline systems, many components may be lubricated to allow for efficient operation of the system. These components may include bearings, gears, multiplate clutches, and some components of electromotors. Components may rotate at high speeds, thus forced lubrication from a center shaft may be used to lubricate components. Oil may enter the center shaft from a housing channel at an inlet and exit the center shaft at an outlet, where a radius of the shaft at the outlet is larger than a radius of the shaft at the inlet. This difference in shaft radii at the inlet and at the outlet, as well as a rotational speed of the shaft, may generate a pumping effect within the shaft due to a centrifugal load on oil in the shaft.

For single-lubrication channels (e.g., where a single channel is used to lubricate at least one component), the pumping effect may assist a gear pump in distributing oil. However, in a driveline system with multiple components on multiple shafts, where each shaft may have a different radius and/or a different rotational speed, and where each component may be positioned a different radial distance from the inlet, the pumping effect may influence distribution of lubricating oil over each component differently. For example, when the driveline system with multiple components includes a fixed lubrication pump (e.g., a gear pump with a constant flow rate), an increased pumping effect on one lubrication channel may result in a decreased lubrication flow rate on other channels. Therefore, the pump flow rate may be increased to supply a desired lubrication amount at each component and for each operating speed. This may result in the pump flow rate being increased above a desired lubrication amount for a first component while attaining a minimum lubrication amount for a second component. Additionally or alternatively, the fixed lubrication pump may not be configured to supply the desired increase in pump flow rate.

U.S. Pat. No. 9,300,189 B2 from Hautz et al. discloses a fluid-cooled electric machine which includes a fluid circuit and an integrated pump element which executes a pumping action to conduct fluid through the fluid circuit as a result of a rotational movement of the electric machine. The electric machine includes a stator and a rotor arranged to demarcate with the stator a conical air gap which is flooded with fluid. The fluid circuit further includes a radial channel in fluid communication with the air gap.

The inventors have recognized several adjustments which may be made to the fluid-cooled electric machine disclosed by Hautz et al., as described above. For instance, a conveying action (e.g., pumping action) achieved by centrifugal forces may convey fluid through the air gap or the rotor, which may result in equalization of fluid temperature, such that boiling of liquid in the air gap can be prevented. However, the pumping action may have different influences on radial and axial cooling channels, depending on shaft radii and rotational speeds of each channel. A greater pumping force from the integrated pump element may be exerted to pump coolant through a channel experiencing a higher centrifugal force than a channel experiencing a lower centrifugal force.

To resolve at least a portion of the aforementioned challenges, the inventors have developed a lubrication system for a rotating shaft having multiple channels. In one example, the system includes a pump coupled to a central lubricant channel, the rotating shaft having a plurality of channels, an air intake channel positioned parallel to an axis of rotation of the rotating shaft, and a first orifice of a first channel of the plurality of channels, where the first orifice is positioned between the air intake channel and the central lubricant channel. Additionally, the air intake channel may include an air intake orifice, which may provide additional control of centrifugal force exerted on the multiple channels. This may result in a more effective and space-efficient (e.g., smaller footprint) design for the rotating shaft, compared to conventional rotating shaft lubrication systems.

In another example, the lubrication system may comprise a plurality of rotating shafts, wherein each of the plurality of rotating shafts has at least two channels, an air intake channel positioned parallel to a housing channel of a rotating shaft and coupled to a first channel of the at least two channels, wherein the first channel has a first orifice positioned thereon between the air intake channel and the housing channel, such that an exit radius of the rotating shaft at a first axial position of the first orifice is approximately equal to an entering radius of the rotating shaft at a second axial position of a first end of the housing channel.

In yet another example, a method for the lubrication system may include pumping oil into a housing channel of a rotating shaft using a pump, distributing oil among a plurality of channels coupled to the housing channel, flowing oil through a first orifice of a first channel, flowing air into an air intake channel via an air intake orifice, mixing air and oil in the first channel downstream of the first orifice of the first channel in a direction of oil flow, and flowing an air and oil mixture out of the first channel at a first outlet to lubricate a first component coupled to the first outlet.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems for effectively and space-efficiently lubricating components of a high speed and/or a high radius shaft. Components may be included in a transmission, a gearbox, an electromotor, and/or another system for which lubrication is desired. Effective lubrication of components coupled to the high speed and/or high radius shaft is achieved by positioning an orifice of a channel of a plurality of channels which experiences a greatest centrifugal load proximate to a housing channel coupled to the channel. For example, positioning the orifice proximate to the housing channel includes positioning the orifice as close as is physically possible to the housing channel while still including the orifice on the respective channel, as further described herein. The orifice may provide a narrowing or choke in a diameter of the respective channel on which the orifice is positioned. Additionally, an air intake channel may be positioned parallel to the axis of rotation and coupled to the channel, downstream of the orifice, to establish environmental pressure in the channel. The orifice may be positioned between the housing channel and the air intake channel. The orifice may thus be positioned a radial distance from the housing channel such that a first radius of the high speed and/or high radius shaft at the orifice position (e.g., an exit radius) is approximately equal to a second radius of the high speed and/or high radius shaft at a first end of the housing channel (e.g., an entering radius). In this way, a pumping effect on the plurality of channels may be decreased such that each channel receives sufficient lubrication.

Figure 1:
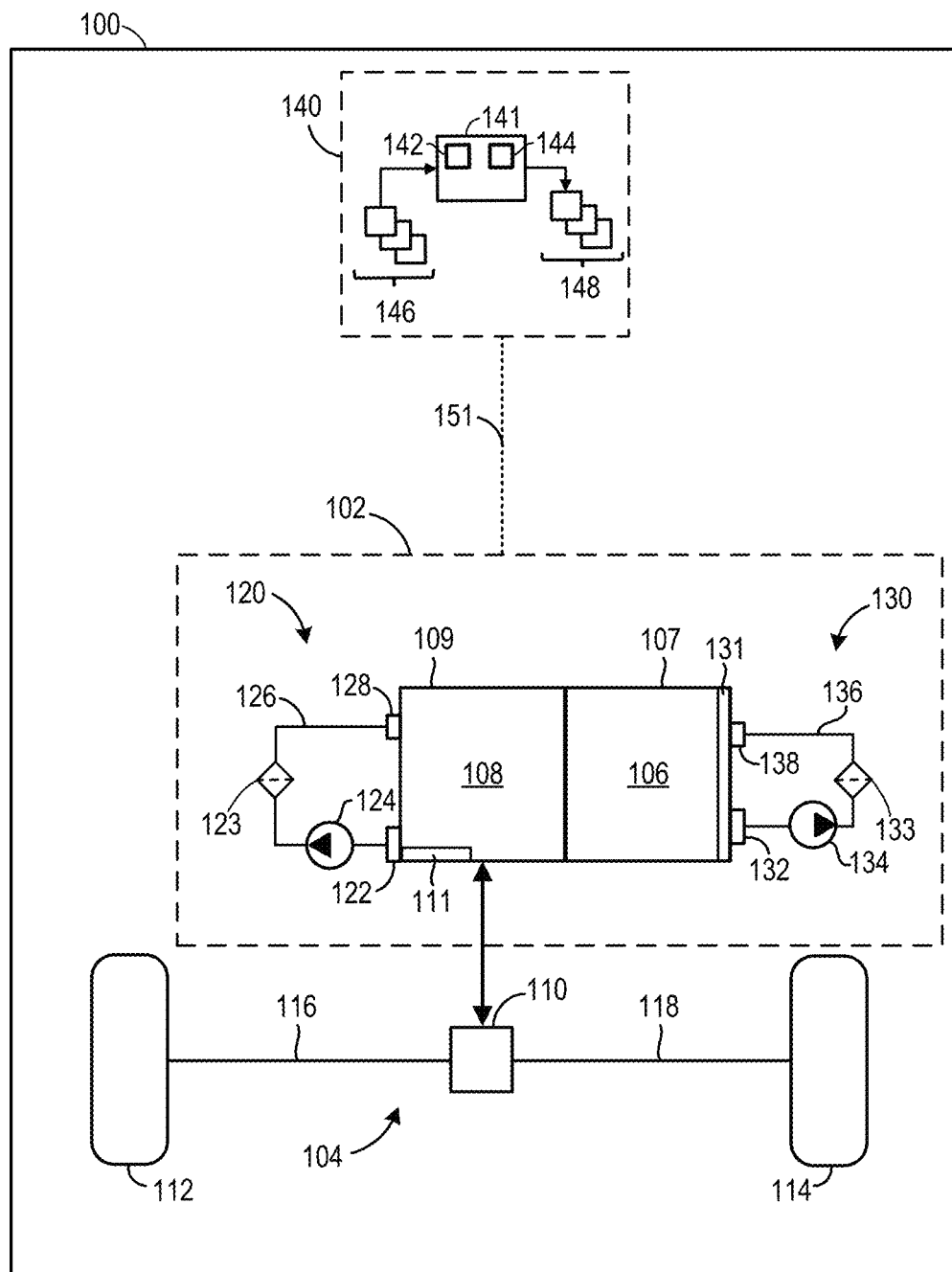
FIG. 1 shows a schematic representation of an electric drive system with lubrication and cooling systems.
Figure 2:
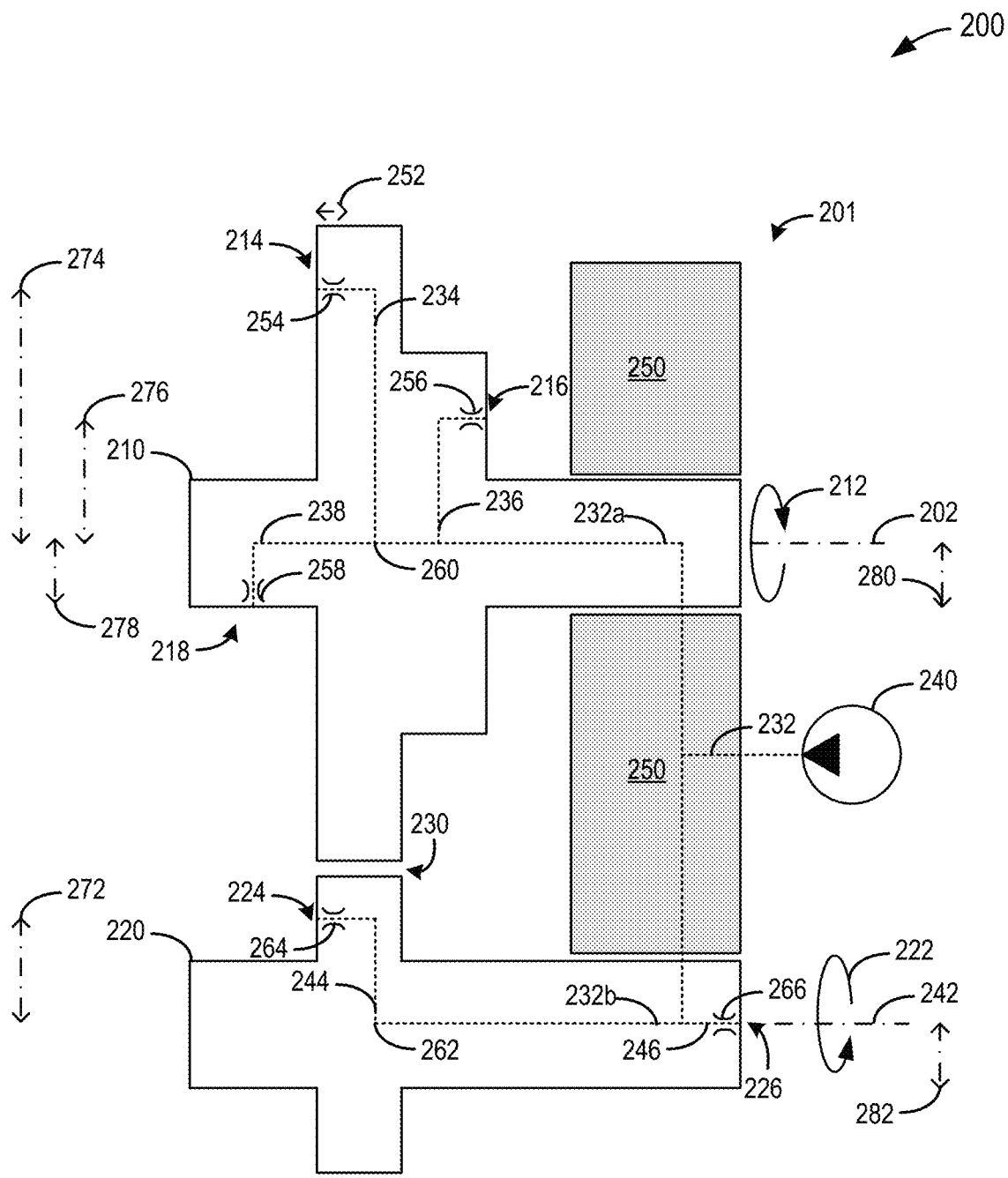
FIG. 2 shows a first configuration of a fictive transmission layout, according to an embodiment of a conventional lubrication system.
Figure 3:
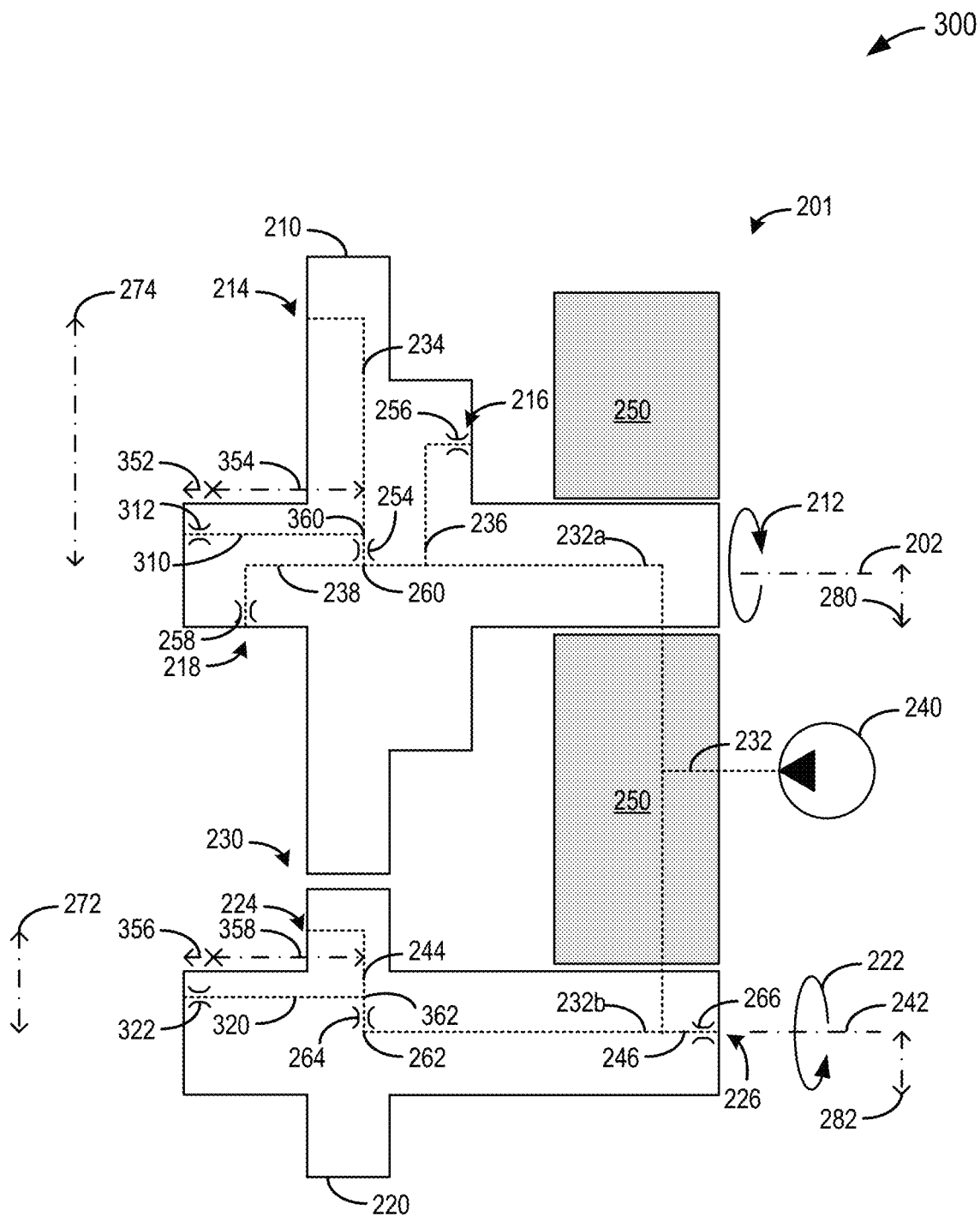
FIG. 3 shows second configuration of the fictive transmission layout, according to a first embodiment of the herein described lubrication system.
Figure 4:
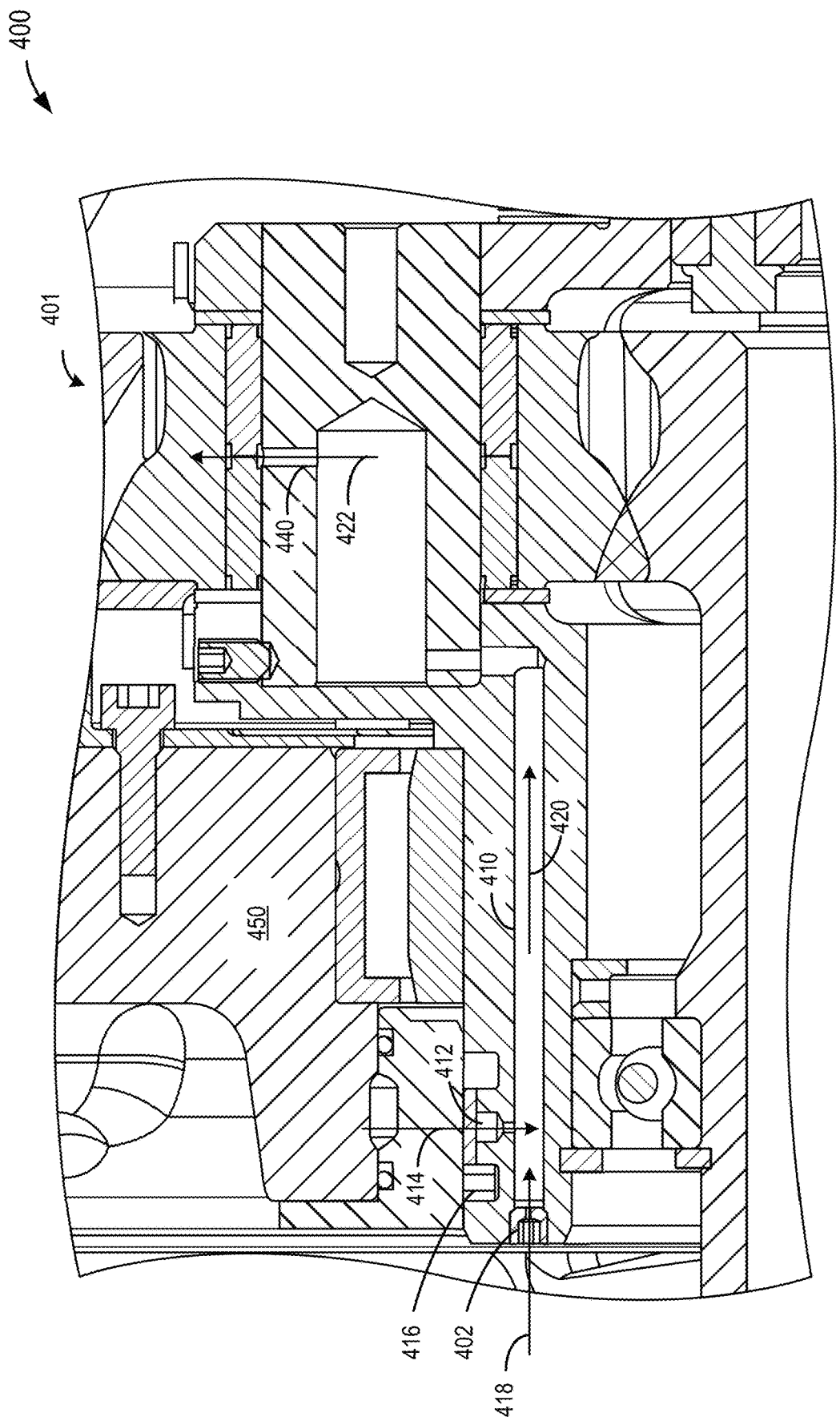
FIG. 4 shows a second embodiment of the herein described lubrication system, as implemented to lubricate planetary gear sets.
Figure 5:
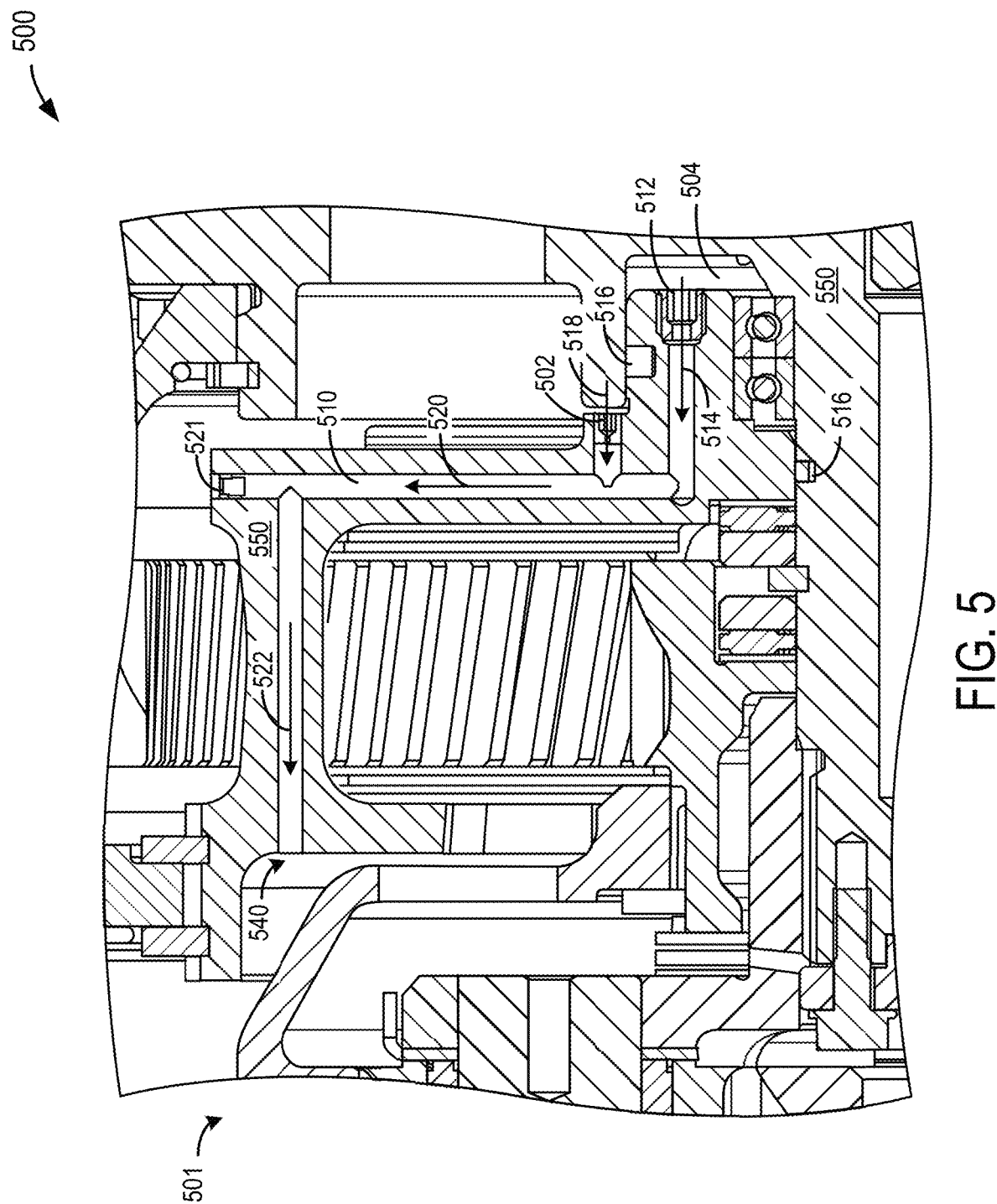
FIG. 5 shows a third embodiment of the herein described lubrication system, as implemented to lubricate a multi-plate brake.
Figure 6:
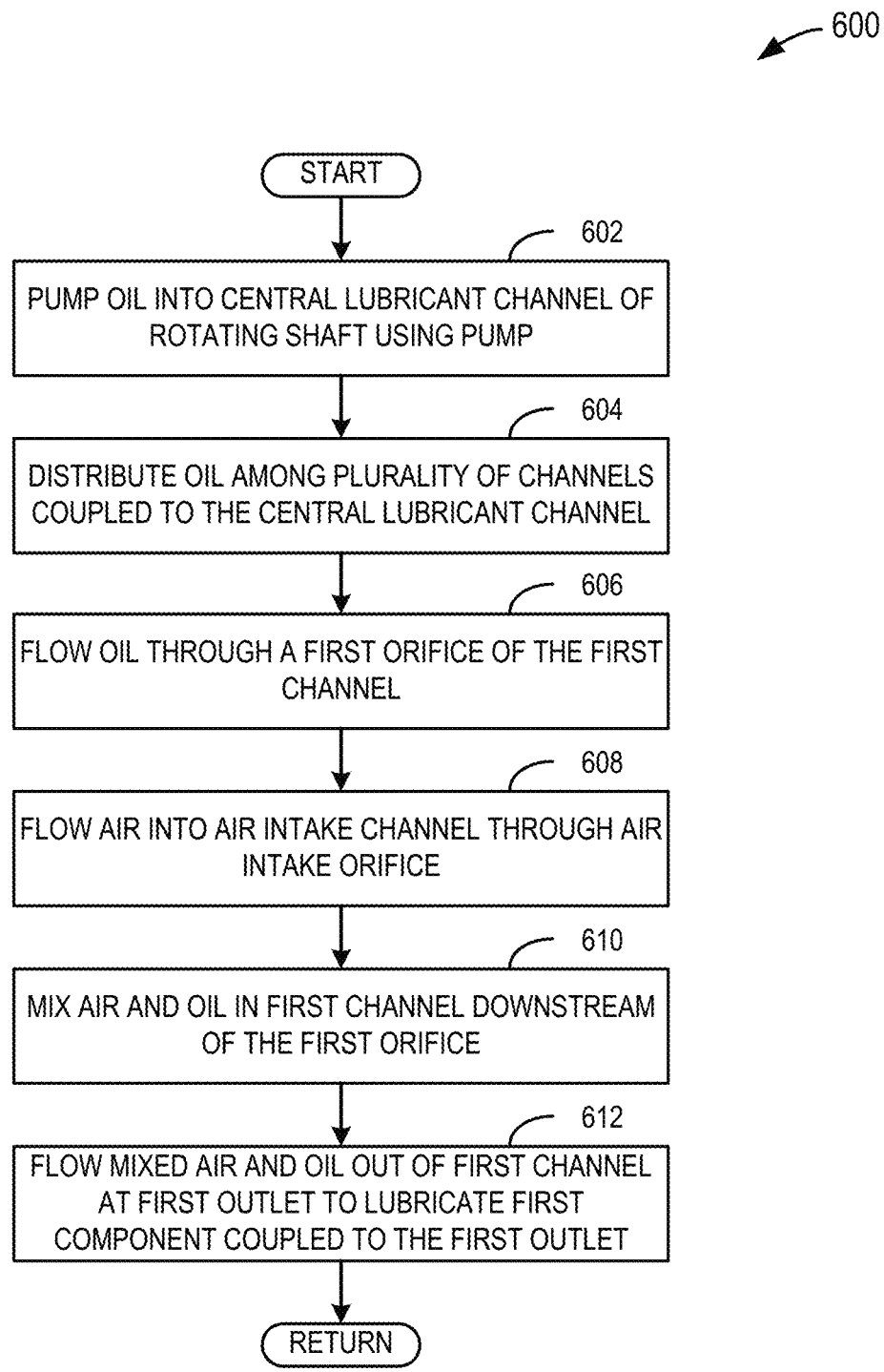
FIG. 6 illustrates a method for the lubrication system of FIGS. 3-5.

FIG. 1 schematically illustrates an electric drive system, including an oil circuit and a coolant circuit. FIG. 2 illustrates a first configuration of a conventional lubrication system implemented in a fictive example of a transmission, which may lubricate the transmission using conventional forced lubrication. FIG. 3 illustrates a second configuration of a lubrication system implemented in the transmission of FIG. 2, where the second configuration of the lubrication system may decrease a pumping effect on lubricant in the lubrication system using lubrication channel orifices and air intake channels. The lubrication system described with respect to FIG. 3 may be used to lubricate a planetary gear set, as shown in FIG. 4, and/or to lubricate a multi-plate brake, as shown in FIG. 5. FIG. 6 illustrates a method for configuring the lubrication system of FIGS. 3-5. FIGS. 4-5 are drawn approximately to scale. However, other relative component dimensions may be used, in other embodiments.

FIG. 1 schematically illustrates a vehicle 100 with an electric drive system 102 that provides power to and/or is incorporated into an axle assembly 104. The vehicle 100 may take a variety of forms in different examples, such as a light, medium, or heavy duty vehicle. Additionally, the electric drive system 102 may be adapted for use in front and/or rear axles, as well as steerable and non-steerable axles. To generate power, the electric drive system 102 may include an electric machine 106. In some examples, the electric machine 106 may be an electric motor-generator and may thus include conventional components such as a rotor, a stator, and the like housed within an electric machine housing 107 for generating mechanical power as well as electric power during a regenerative mode, in some cases. Further, in other examples, the vehicle 100 may include an additional motive power source, such as an internal combustion engine (ICE) (e.g., a spark and/or compression ignition engine), for providing power to another axle. As such, the electric drive system 102 may be utilized in an electric vehicle (EV), such as a hybrid electric vehicle (HEV) or a battery electric vehicle (BEV).

In some examples, the electric machine housing 107 may be coupled (e.g., via bolts) to a housing 109 of a gearbox 108. Further, the electric machine 106 may provide mechanical power to a differential 110 via the gearbox 108. From the differential 110, mechanical power may be transferred to drive wheels 112, 114 by way of axle shafts 116, 118, respectively, of the axle assembly 104. As such, the differential 110 may distribute torque, received from the electric machine 106 via the gearbox 108, to the drive wheels 112, 114 of the axle shafts 116, 118, respectively, during certain operating conditions. In some examples, the differential 110 may be a locking differential, an electronically controlled limited slip differential, or a torque vectoring differential.

The gearbox 108 may be a single-speed gearbox, where the gearbox operates in one gear ratio. However, other gearbox arrangements have been envisioned such as a multi-speed gearbox that is designed to operate in multiple distinct gear ratios. Further, in one example, the electric machine 106, the gearbox 108, and the differential 110 may be incorporated into the axle assembly 104, forming an electric axle (e-axle) in the vehicle 100. The e-axle, among other functions, provides motive power to the drive wheels 112, 114 during operation. Specifically, in the e-axle embodiment, the electric machine and gearbox assembly may be coupled to and/or otherwise supported by an axle housing. In one particular example, the e-axle may be an electric beam axle where a solid piece of material (e.g., a beam, a shaft, and/or a housing extend(s) between the drive wheels). The e-axle may provide a compact arrangement for delivering power directly to the axle. In other examples, however, the electric machine 106 and the gearbox 108 may be included in an electric transmission in which the gearbox and/or electric motor are spaced away from the axle. For instance, in the electric transmission example, mechanical components such as a driveshaft, joints (e.g., universal joints), and the like may provide a rotational connection between the electric transmission and the drive axle.

The electric drive system 102 may further include an oil circuit 120 for circulating oil (e.g., natural and/or synthetic oil) through the gearbox housing 109 to lubricate and/or cool various system components. The oil circuit 120 may include a filter 123 and an oil pump 124 that draws oil from an oil reservoir 111 (e.g., a sump) in the gearbox housing 109, via an outlet 122, and drives a pressurized oil flow through a delivery line 126 to an inlet 128 of the gearbox housing 109. The filter 123 may be positioned downstream of the oil pump 124, so as to not increase a suction height of the oil circuit 120. In some examples, the oil pump 124 may be provided at an exterior portion of the gearbox housing 109. However, in other examples, the oil pump may be included within the gearbox housing 109. Various distribution components and arrangements (e.g., nozzles, valves, jets, oil passages, and the like) of the oil circuit 120 may be included within the electric drive system 102 in order to facilitate routing of the oil within the gearbox housing 109 and, in one particular example, to a portion of the electric machine housing 107. In some cases, the oil circuit 120 may be used for routing oil to various gearbox shafts and gears as well as a rotor shaft bearing of the electric machine, thereby providing an efficient system for effectively using the gearbox oil to lubricate elements of the electric machine and the gearbox. Exemplary oil passages, and the flow of oil therethrough for lubricating particular components, are expanded upon herein with reference to FIGS. 2-5.

The electric drive system 102 may further include a coolant circuit 130 that circulates coolant (e.g., water and/or glycol) through a water jacket 131 formed in the electric machine housing 107. The coolant circuit 130 may include a coolant inlet 138 and a coolant outlet 132 positioned on (or in) the electric machine housing 107. The coolant circuit 130 may further include a filter 133 and a pump 134 that circulates coolant from the coolant outlet 132 to the coolant inlet 138 via a coolant delivery line 136. From the coolant inlet 138, the coolant travels into the water jacket 131 formed in the electric machine housing 107 which removes heat from components of the electric machine 106. In some examples, the coolant circuit 130 may further include a heat exchanger (e.g., radiator) which removes heat from the coolant that exits the electric machine housing 107 by way of the coolant outlet 132. In further embodiments, the oil circuit 120 may additionally or alternatively include a heat exchanger (e.g., radiator) which removes heat from the oil that exits the gearbox housing 109 by way of the outlet 122.

The vehicle 100 may also include a control system 140 with a controller 141. The controller 141 may include a processor 142 and a memory 144. The memory may hold instructions stored therein that when executed by the processor cause the controller 141 to perform various methods, control techniques, and the like described herein. The processor 142 may include a microprocessor unit and/or other types of circuits. The memory 144 may include known data storage mediums such as random access memory, read only memory, keep alive memory, combinations thereof, and the like. The controller 141 may receive various signals from sensors 146 positioned in different locations in the vehicle 100 and electric drive system 102. The controller 141 may also send control signals to various actuators 148 coupled at different locations in the vehicle 100 and electric drive system 102. The control system 140 and the electric drive system 102 may thus be communicatively coupled, as is indicated by the dotted line 151. For instance, the controller 141 may send command signals to the oil pump 124 and/or the pump 134 and, in response, the actuator(s) in the pump(s) may be adjusted to alter the flowrate of the oil and/or coolant delivered therefrom. In other examples, the controller may send control signals to the electric machine 106 and, responsive to receiving the command signals, the electric machine may be adjusted to alter a rotor speed. The other controllable components in the system may be operated in a similar manner with regard to sensor signals and actuator adjustment.

An axis system 150 is provided in FIG. 1, as well as FIGS. 2-5, for reference. The z-axis may be a vertical axis (e.g., parallel to a gravitational axis), the x-axis may be a lateral axis (e.g., horizontal axis), and the y-axis may be a longitudinal axis, in one example. However, the axes may have other orientations, in other examples.

FIGS. 2-3 show a fictive layout of a transmission 201, which may include components for which lubrication is desired. For example, the transmission 201 may include a gearbox and an electric machine, as briefly described with reference to FIG. 1. A first configuration 200 of FIG. 2 shows the transmission 201 configured with a conventional lubrication system. A second configuration 300 of FIG. 3 shows the transmission 201 configured with the lubrication system described herein, which may reduce pumping effects in channels of the transmission 201, compared to pumping effects in channels of the first configuration 200 of the transmission 201 having the conventional lubrication system. For example, when an outlet radius is greater than an inlet radius, a centrifugal load may provide additional force to the flow provided by the pump, therefore the centrifugal load is referred to a having a pumping effect. When the outlet radius is less than the inlet radius, the centrifugal load may oppose flow provided by the pump, and a centrifugal pressure may therefore be opposite to a pump pressure (e.g., may not provide a pumping effect). A conventional lubrication system for the transmission 201 will be described herein with reference to the first configuration 200 of FIG. 2. Differences between the first configuration 200 and the second configuration 300 (e.g., the lubrication system for effective and space-efficient lubrication) will be described with reference to FIG. 3.

The transmission 201, as shown in the first configuration 200 of FIG. 2, includes a first gear shaft 210 and a second gear shaft 220 in meshing connection (at an interface 230), a pump 240 for pumping lubricant through each of the first gear shaft 210 and the second gear shaft 220, and five locations on the first gear shaft 210 and the second gear shaft 220, collectively, which receive forced lubrication via a respective outlet. Each of the first gear shaft 210 and the second gear shaft 220 may be coupled to a housing 250. The first gear shaft 210 may rotate in a direction indicated by a first arrow 212 about a first axis of rotation 202, and the second gear shaft 220 may rotate in a direction indicated by a second arrow 222 about a second axis of rotation 242.

Forced lubrication (e.g., oil or other lubricating medium) may be delivered to each of the five locations via a respective outlet. At least one component for which lubrication is desired may be positioned at each of the five locations. Components may be coupled to a gear shaft of the first gear shaft 210 and the second gear shaft 220, or may be positioned proximate to the gear shaft such that lubricant expelled from the respective outlet may sufficiently lubricate the component. Components may include a gear, a bearing, a clutch, and so on.

The first gear shaft 210 may include a first outlet 214 at the end of a first channel 234, a second outlet 216 at the end of a second channel 236, and a third outlet 218 at the end of a third channel 238. The second gear shaft 220 may include a fourth outlet 224 at the end of a fourth channel 244, and a fifth outlet 226 at the end of a fifth channel 246. Each of the first channel 234, the second channel 236, the third channel 238, the fourth channel 244, and the fifth channel 246 may be coupled to a housing channel 232 (e.g., a central lubricant channel), which extends from the pump 240 and provides oil or other lubricating medium to each of the five channels. The first channel 234, the second channel 236, and the third channel 238 may be coupled to the housing channel 232 via a first branch 232a of the housing channel 232. The fourth channel 244 and the fifth channel 246 may be coupled to the housing channel 232 via a second branch 232b of the housing channel 232. The first branch 232a may extend along the first axis of rotation 202 and the second branch 232b may extend along the second axis of rotation 242, such that the first branch 232a and the second branch 232b are parallel in the embodiment of FIG. 2.

An orifice, as indicated in FIG. 2 by a pair of curved lines surrounding the respective channel, may be positioned at each of the first outlet 214, the second outlet 216, the third outlet 218, the fourth outlet 224, and the fifth outlet 226. The orifice may be a narrowing or choke in a channel diameter. The orifice may therefore decrease the channel diameter for a first length, equal to a length of the orifice, to an orifice diameter which is more narrow than the channel diameter which extends a second length, equal to a remaining length of the channel. The length of the orifice may be between 1 mm and 2 mm, in some of a plurality of embodiments. Along the length of the orifice, the diameter of the orifice may gradually narrow from the channel diameter (as further described below) to a smaller diameter and expand back to the channel diameter. In other embodiments, the orifice may provide a stepped diameter change, for example, the channel diameter may narrow from 8 mm to 1 mm at a first end of the orifice, the orifice diameter may be 1 mm for the length of the orifice, and the channel diameter may expand to 8 mm at a second end of the orifice, opposite the first end of the orifice.

For example, the first channel 234 may have a first orifice 254, which may extend a first length 252. At the first outlet 214, the channel diameter of the first channel 234 may be approximately 8 mm. At the first orifice 254, a diameter of the first channel 234 may gradually narrow from 8 mm to 1 mm, where the diameter of the first channel 234 is equal to 1 mm at an approximate center of the first length 252. The diameter of the first channel 234 may gradually widen from 1 mm to 8 mm over the remainder of the first length 252 of the first orifice 254. Thus, the diameter of the first channel 234 may be narrowed at the first orifice 254 to an orifice diameter relative to the diameter of the first channel 234 at the first outlet 214 and for a second length of the first channel 234. The second length of the first channel 234 may be a length of the first channel 234 between an end of the first orifice 254 (e.g., distal from the first outlet 214) and a first intersection 260 between the first channel 234 and the first branch 232a of the housing channel 232. The second length may be greater than the first length 252 (e.g., the length of the orifice). The diameter of the first channel 234 for the second length may be approximately 8 mm (e.g., equal to the diameter of the first channel 234 at the first outlet 214). The diameter of the first channel 234 at the first outlet 214, along the first length 252, and along the second length may have values other than 8 mm, 1 mm, and 8 mm, respectively, so long as diameters of the first channel 234 at the first outlet 214 and along the second length are greater than the diameter along the first length 252 (e.g., the length of the orifice), and each of the different diameters (e.g., the orifice diameter and the channel diameter) allow for sufficient lubricant flow, as further described herein with respect to flow resistance and pumping effects.

The diameter of the first channel 234 for the second length may be less than a diameter of the first branch 232a, and the diameter of the first branch 232a may be less than a diameter of the housing channel 232. For example, moving from the housing channel 232 along a liquid flow path towards the first outlet 214, the channel diameter may decrease at each intersection (e.g., where the first channel 234, the second channel 236, and the third channel 238 each branch off from the first branch 232a), such that the channel diameter of the first channel 234, the second channel 236, and the third channel 238 may be less than the channel diameter of the first branch 232a. In this way, a through flow section may be reduced and a flow rate may decrease moving in a direction of the liquid flow path, as indicated by an arrow of the pump 240.

Similarly, the second channel 236 may have a second orifice 256, the third channel 238 may have a third orifice 258, the fourth channel 244 may have a fourth orifice 264, and the fifth channel 246 may have a fifth orifice 266. Each of the second orifice 256, the third orifice 258, the fourth orifice 264, and the fifth orifice 266 may extend the first length 252 and may decrease (e.g., narrow) a diameter of the respective channel for the first length 252, as described with respect to the first orifice 254.

In some of a plurality of embodiments, each of the diameters of the first channel 234, the second channel 236, the third channel 238, the fourth channel 244, and the fifth channel 246, may be approximately equal for the respective second length (e.g., between an end of the respective orifice and an intersection with the respective first branch 232a or second branch 232b of the housing channel 232). For example, the diameter of each of the first channel 234, the second channel 236, the third channel 238, the fourth channel 244, and the fifth channel 246 may be approximately equal to 8 mm upstream of the respective orifice, with respect to the liquid flow path.

The first length 252 (e.g., the length of the orifice) may be equivalent for each of the first orifice 254, the second orifice 256, the third orifice 258, the fourth orifice 264, and the fifth orifice 266, while the second length may be different for each of the five channels, dependent on a distance between the respective orifice and the first branch 232a or the second branch 232b. For example, the second length of the fourth channel 244, which extends between an end of the fourth orifice 264 (e.g., distal from the fourth outlet 224) and a second intersection 262 between the fourth channel 244 and the second branch 232b of the housing channel 232, may be less than the second length of the first channel 234.

The pump 240 may be a fixed and/or a variable flow rate pump which provides forced oil flow (e.g., forced lubrication) through each of the five channels to the respective outlets. The pump 240 may be the oil pump 124 of FIG. 1. For example, the pump 240 may be a gear pump. Flow provided by the pump 240 may be divided over each of the five outlets at a ratio determined by flow resistance of an outlet's respective channel and orifice. For example, flow resistance of each of the five channels may be different due to differences in the respective length of the channel from the pump to the respective outlet, as well as a difference in entering radius and exit radius of the respective shaft for each channel, as further described herein. For example, flow resistance may increase as channel length increases and/or as channel diameter decreases.

In the example of FIG. 2, the first outlet 214 and the fourth outlet 224 may encounter the largest centrifugal loads and the greatest pumping effects of the five outlets due to their respective radial positions and rotational speeds. For the first gear shaft 210, the first outlet 214 is positioned at a highest radial position (e.g., furthest from the first axis of rotation 202 of the first gear shaft 210) relative to the second outlet 216 and the third outlet 218. The second length of the second channel 236 and the second length of the third channel 238 may be approximately equal, however the second outlet 216 may have a greater radial position (e.g., further from the first axis of rotation 202) than the third outlet 218. The first outlet 214 may be a first radial distance 274 from the first axis of rotation 202. The first radial distance 274 may be greater than both a second radial distance 276 between the second outlet 216 and the first axis of rotation 202 and a third radial distance 278 between the third outlet 218 and the first axis of rotation 202. Thus the first outlet 214 may experience a greater centrifugal load and a greater pumping effect than the second outlet 216 and the third outlet 218, which are positioned at a lower radial position (e.g., closer to the first axis of rotation 202).

For the second gear shaft 220, the fourth outlet 224 is positioned a further radial distance from the second axis of rotation 242 of the second gear shaft 220 than the fifth outlet 226, thus the fourth outlet 224 has a larger rotational speed than the fifth outlet 226. The fourth outlet 224 may be a fourth radial distance 272 from the second axis of rotation 242. The fifth outlet 226 may be in alignment with the second axis of rotation 242, thus the fourth outlet 224 may experience a greater centrifugal load and a greater pumping effect than the fifth outlet 226. The radial position of each of the first orifice 254, the second orifice 256, the third orifice 258, the fourth orifice 264, and the fifth orifice 266 may herein be referred to as an exit radius of the respective gear shaft (e.g., the first gear shaft 210 or the second gear shaft 220) for the respective channel. In the embodiment shown in FIG. 2, each of the first orifice 254, the second orifice 256, the third orifice 258, the fourth orifice 264, and the fifth orifice 266 are positioned at the respective channel outlet, thus the exit radius (e.g., position of the respective orifice) may be equal to the radial distance from the respective axis of rotation of the respective outlet (e.g., the first radial distance 274 for the first outlet 214 and the first orifice 254). In other words, for the first gear shaft 210, the first radial distance 274 is equal to a first exit radius of the first channel 234, the second radial distance 276 is equal to a second exit radius of the second channel 236, and the third radial distance 278 is equal to a third exit radius of the third channel 238. For the second gear shaft 220, the fourth radial distance 272 is equal to a fourth exit radius of the fourth channel 244, and a fifth exit radius of the fifth channel 246 is equal to an entering radius, as further described below. The exit radius of an orifice (e.g., of a channel) thus indicates a radial location of the orifice.

Further, a first entering radius 280 of the first gear shaft 210 and a second entering radius 282 of the second gear shaft 220 may be a radius of the respective shaft at a region where channels of the shaft begin. For example, the first entering radius 280 may be the radius of the first gear shaft 210 at a beginning of the first branch 232a along the first axis of rotation 202. Therefore, the entering radii for the first channel 234, the second channel 236, and the third channel 238 are equal to the first entering radius 280. The second entering radius 282 may be the radius of the second gear shaft at a beginning of the second branch 232b along the second axis of rotation 242. Therefore, the entering radii for the fourth channel 244 and the fifth channel 246 are equal to the second entering radius 282. The first entering radius 280 and the second entering radius 282 may be characteristic of the receptive gear shaft. As shown by the fictive layout of a transmission 201, radii of the first gear shaft 210 and the second gear shaft 220 change along the respective first axis of rotation 202 and second axis of rotation 242. For example, the first entering radius 280 is less than the exit radius of the first channel 234 (e.g., less than the first radial distance 274) and is less than the exit radius of the second channel 236 (e.g., less than the second radial distance 276). The first entering radius 280 may be equal to or less than the exit radius of the third channel 238 (e.g., equal to or less than the third radial distance 278). As shown in FIG. 2, the second entering radius 282 is less than the exit radius of the fourth channel 244 (e.g., less than the fourth radial distance 272). The exit radius of the fifth channel 246 may be approximately zero, as the fifth outlet 226 is positioned along the second axis of rotation 242.

In this way, a difference in entering radius and exit radius for a channel, where the entering radius is less than a respective exit radius, may create a pumping effect by the shaft (e.g., the first gear shaft 210 and/or the second gear shaft 220) due to the centrifugal load on the oil. Thus, in the first configuration 200 of FIG. 2, oil may enter and travel through the rotating shaft (e.g., the first gear shaft 210 and/or the second gear shaft 220) at a smaller diameter (e.g., twice the first entering radius 280) and exit the rotating shaft at a larger diameter (e.g., twice the first radial distance 274 for the first channel 234). When each shaft has a single channel, the pumping effect may assist the lubrication pump (e.g., the pump 240) in moving lubricant along the channel. However, in shafts having more than one channel, such as the first gear shaft 210 and the second gear shaft 220, the pumping effect may further influence distribution of oil among the multiple channels.

In the first configuration 200 of the transmission 201, distribution of lubrication (e.g., oil) flow among the five channels to the respective outlets may be largely influenced by respective pumping effects of the first outlet 214 and the fourth outlet 224. In other words, due to the aforementioned greater pumping effects, flow demand on the pump 240 may be established based on a pump flow rate used to sufficiently pump oil to each of the first outlet 214 and the fourth outlet 224. The second outlet 216, the third outlet 218, and the fifth outlet 226 may therefore receive a lesser flow rate than is desired to sufficiently lubricate elements at the respective outlets. Use of a pump which is configured to output a greater pump flow rate than the pump 240 may be desired to achieve a minimum flow rate desired at each of the second outlet 216, the third outlet 218, and the fifth outlet 226, as well as the first outlet 214 and the fourth outlet 224. When the exit radius is less than the entering radius for a given channel, the centrifugal load may oppose a pumping power (e.g., pump flow rate of the pump 240). Distribution of oil among multiple channels of the shaft may thus be dependent of the speed of the shaft, which may also lead to a desire for a more powerful pump (e.g., which may output the greater pump flow rate) and/or greater sump volume, which may result in a decreased efficiency of the transmission. However, incorporating a more powerful pump into the transmission 201 may increase a complexity and a footprint (e.g., size and weight) of the transmission 201. Alternatively, and as further described herein, adjustments may be made to the transmission 201 to decrease pumping effects and therefore decrease the demanded pump flow rate such that the pump 240 may sufficiently deliver the demanded pump flow rate.

The transmission 201 described in FIG. 2 may be representative of a transmission or other lubrication system having multiple channels. Transmissions and other lubrication systems having similar designs to those of the transmission 201 described in FIG. 2 may be less compact and have a greater weight compared to the herein described lubrication system, as large flow rates may imply a large sump volume. Additionally, a larger flow rate may result in an increase in pumping power, which may decrease efficiency of the transmission as this power is not being used to power wheels of the vehicle and instead is being used to pump liquid. This may result in a larger footprint of the transmission, as briefly described above. Additional examples of lubrication systems having multiple channels are shown in and described with reference to FIGS. 3-5.

As described with respect to FIG. 2, orifice position, number of channels, entering radius, and exit radius may influence a lubricant flow rate through each of the channels and therefore a pump flow rate used by the pump (e.g., the pump 240) to achieve a minimum desired lubricant flow rate at each of the outlets. Lubrication systems may be designed to achieve desired lubrication flow at each of multiple locations by adjusting at least one orifice position. Designing of lubrication systems may be done analytically by experimental hydrodynamic formulas, via a computational fluid dynamics (CFD) simulation or via a test setup, or a combination of the aforementioned methods.

FIG. 3 shows the second configuration 300 of the transmission 201, where the transmission 201 is configured with the lubrication system described herein, which may reduce pumping effects at outlets of the transmission 201, compared to pumping effects at outlets of the first configuration 200 of the transmission 201 having the conventional lubrication system. The second configuration 300 may include elements similar or equivalent to elements of the first configuration 200, which may be similarly labeled and not reintroduced for brevity.

As briefly described above, the second configuration 300 lubrication system may reduce pumping effects at outlets of the transmission 201 by configuring a channel of an outlet which may experience a largest centrifugal force of the plurality of outlets with an orifice proximate to the housing channel 232 (e.g., such that a radial distance between the orifice and the respective first branch 232a or the second branch 232b of the housing channel 232 is as small as possible) as opposed to proximate (e.g., closer to) to the outlet of the channel. In this way, a radial distance of the orifice may be reduced, such that the exit radius of the respective shaft for the given channel is as close as possible to the first entering radius 280.

As described with respect to FIG. 2, the orifice may narrow the channel diameter to the orifice diameter (e.g., from 8 mm to 1 mm) and have a first length 252 (e.g., the length of the orifice). A remaining length of the channel, referred to as a third length with respect to FIG. 3, may extend from an end of the orifice distal from the housing channel 232 to the respective outlet. A diameter of the third length may be equal to the diameter of the channel along the second length, which is greater than the diameter of the orifice. Further, an air intake channel may be positioned parallel to the housing channel 232 and proximate to (e.g., as small of a radial and/or axial distance as is possible to) the orifice which is proximate to the housing channel 232, as further described herein.

To counteract the centrifugal load on the first outlet 214, as described with reference to FIG. 2, and reduce the pumping effect on the first outlet 214, in the second configuration 300, the first orifice 254 may be positioned proximate to the first axis of rotation 202. For example, positioning the orifice proximate to the housing channel includes positioning the orifice as close as is physically possible to the housing channel while still including the orifice on the respective channel. Relative to the first configuration 200 as described with reference to FIG. 2, the first orifice 254 may be shifted from a position proximate to the first outlet 214 closer to the first axis of rotation 202. The first orifice 254 may be configured as described with respect to the first configuration 200 (e.g., having the orifice diameter for the first length 252). The diameter of the third length of the first channel 234 may be equal to the diameter of the second length of the channel (e.g., 8 mm). In the second configuration 300, the third length of the first channel 234 may extend from an end of the first orifice 254 (opposite the first intersection 260, proximate to a third intersection 360) to the first outlet 214. Thus, the first orifice 254 is positioned a smaller radial distance from the first axis of rotation 202 in the second configuration 300 compared to the first radial distance 274, as described with respect to the first configuration 200.

The first orifice 254 as positioned in the second configuration 300 may therefore have an exit radius which is less than the exit radius of the first orifice 254 in the first configuration 200. Each of the second orifice 256 and the third orifice 258 may be positioned as described with respect to the first configuration 200 (e.g., proximate to the respective outlet). A radial distance between the first branch 232a and the first orifice 254 may be as small as possible, such that the exit radius of the first gear shaft 210 at the first channel 234 (e.g., the first exit radius) may be proximate to the first entering radius 280 of the first gear shaft 210 in the second configuration 300. It may be desirable for the first exit radius to equal the first entering radius 280, however this may further complicate the lubrication system. Herein, when an exit radius is described as approximately equal to a respective entering radius, it is to be understood that the exit radius is as close to the entering radius as possible, in terms of a value of the respective radii, while retaining a desired configuration of the lubrication system.

When an exit radius is greater than an entering radius, a centrifugal load may provide additional force to the flow provided by the pump, therefore the centrifugal load provides a pumping effect. When the exit radius is less than the entering radius, the centrifugal load may oppose flow provided by the pump, and a centrifugal pressure may therefore be opposite to a pump pressure (e.g., may not provide a pumping effect). In this way, centrifugal load and therefore pumping effects on oil in the first channel 234 may be reduced by configuring the first channel 234 with the radial distance of the first orifice 254, and thus the exit radius, to be approximately equal to the first entering radius 280 of the first gear shaft 210. When the entering radius and the exit radius of a shaft and an orifice positioned on a channel thereof are equal, a centrifugal load and therefore pump effect may be equal to zero. The pumping effect (e.g., when the centrifugal force increases the pump flow rate provided by the pump 240) may thus be reduced, allowing for control of the distribution of oil among the multiple channels using the pump 240.

To counteract the centrifugal load on the fourth outlet 224, as described with reference to FIG. 2, and reduce the pumping effect on the fourth outlet 224, in the second configuration 300, the fourth orifice 264 may be positioned proximate to the second axis of rotation 242. Relative to the first configuration 200 as described with reference to FIG. 2, the fourth orifice 264 may be shifted from a position proximate to the fourth outlet 224 to a position proximate to the second axis of rotation 242. The fourth orifice 264 may be configured as described with respect to the first configuration 200 (e.g., having the orifice diameter for the first length 252). The diameter of the third length of the fourth channel 244 may be equal to the diameter of the second length of the channel (e.g., 8 mm). The third length of the fourth channel 244 may extend from an end of the fourth orifice 264 (opposite the second intersection 262, proximate to a fourth intersection 362) to the fourth outlet 224. Thus, the fourth orifice 264 is positioned a smaller radial distance from the second axis of rotation 242 in the second configuration 300 compared to the fourth radial distance 272 as described with respect to the first configuration 200. The fourth orifice 264 as positioned in the second configuration 300 may therefore have an exit radius which is less than the exit radius of the fourth orifice 264 in the first configuration 200. A radial distance between the second branch 232b and the fourth orifice 264 may be as small as possible, such that the exit radius of the fourth orifice 264 in the second configuration 300 may be approximately equal to the second entering radius 282 of the second gear shaft 220, and therefore, of the fourth channel 244. In this way, centrifugal load and therefore pumping effects on oil in the fourth channel 244 may be reduced by reducing the radial distance of the orifice, and thus the exit radius, to be approximately equal to the second entering radius 282 of the second gear shaft 220. The fifth orifice 266 may be positioned as described with respect to the first configuration 200 (e.g., proximate to the fifth outlet 226).

A pumping effect on oil flowing through channels of a rotating shaft may thus be reduced by moving the orifice of the outlet experiencing the greatest centrifugal load of outlets on the respective rotating shaft as close as possible to the respective axis of rotation. As shown in the second configuration 300, it is desirable to move an orifice of a channel experiencing a greatest centrifugal load, due to radial distance from an axis of rotation and/or a rotational speed, as close as possible to the respective axis of rotation to reduce the pumping effect provided by the centrifugal load. If a radial position of an orifice is equal to the radial position of the shaft inlet, the centrifugal force and therefore the pumping effect may be reduced to zero, which is desirable, as the centrifugal force may therefore not contribute to the pumping power of the pump (e.g., the pump 240). In configurations where the orifice may not be in the same radial position as the shaft inlet, positioning the orifice with as small as possible of a radial position with respect to the shaft axis of rotation is desirable. Centrifugal load is quadratically proportional to the radial position, thus it is preferable to have as small of a radial position as possible.

As briefly described above, positioning an orifice in proximity to the respective housing branch (e.g., the first branch 232a or the second branch 232b) results in the third length of the channel (e.g., downstream of the orifice, with respect to lubricant flow), which has a larger diameter than the orifice. The radial position of the orifice (e.g., exit radius) may therefore be equal to or less than the entering radius of the respective shaft. The pump effect may still exist downstream of the orifice when the channel is full of lubricant, as the third length of the channel may be at a pressure which is less than environmental pressure. Pumping effects may be further reduced by reduced by establishing environmental pressure downstream of the orifice. Environmental pressure may be established at the orifice and thus the third length of the channel downstream of the orifice by including an air intake channel downstream of the orifice. The air intake channel may allow air to reach the downstream side of the orifice and thus impose the environmental pressure at and downstream of the orifice.

The air intake channel may be positioned parallel to the axis of rotation (e.g., the first axis of rotation 202, and/or the second axis of rotation 242). This may assist in reducing an amount of oil or other lubricant from flowing from the respective channel into the air intake channel, as centrifugal load on the lubricant (e.g., oil) may push the lubricant through radial lubrication channels. When the shaft (e.g., the first gear shaft 210 and/or the second gear shaft 220) is not rotating, a quantity of lubricant may flow into the axially positioned air intake channel. To assist in reducing the quantity of lubricant flowing out of the air intake channel, the air intake channel may be configured with an orifice. An air intake orifice may be sufficiently small such that a diameter of the air intake orifice is less than a diameter of an orifice of the lubricating channels, such as the first orifice 254 of the first channel 234, the second orifice 256 of the second channel 236, and so on, while being large enough to prevent or reduce clogging, considering a selected oil filter filtration rate, as further described herein. For example, the diameter of the air intake orifice may be 0.7 mm for an oil filter which is conventionally implemented in oil circuits of an electric drive system (e.g., the electric drive system 102 of FIG. 1). The diameter of the air intake orifice may be reduced to be less than 0.7 mm for filters having finer filtration, as the diameter of the air intake orifice may be directly proportional to filtration rate of the oil filter (e.g., the filter 123 of the oil circuit 120 of FIG. 1).

A first air intake channel 310 may be included in the second configuration 300 of the transmission 201 to further reduce pumping effects on the first outlet 214. The first air intake channel 310 may be parallel to the first axis of rotation 202 and be coupled to the first channel 234 at the third intersection 360. The third intersection 360 may be downstream (e.g., relative to the direction of lubricant flow through the first channel 234) of the first orifice 254 and may thus allow air to reach the third length of the first channel 234 downstream of the first orifice 254.

The first air intake channel 310 may include a first air intake orifice 312 which has a first air intake orifice length 352. The first air intake orifice length 352 may be equal to or different from the first length 252 of the first orifice 254, as described with respect to FIG. 2. Additionally, the first air intake orifice 312 may have a first air intake orifice diameter, which may be equal to or less than the orifice diameter of the first orifice 254. For example, the first air intake orifice diameter may be 0.7 mm. The first air intake orifice 312 may be positioned at an air intake channel outlet, axially distal from the third intersection 360. The first air intake channel 310 may further have a first air intake channel length 354 downstream of the first air intake orifice 312 relative to air flow into the first air intake orifice 312. The first air intake channel length 354 may have a first air intake channel diameter which is greater than the first air intake orifice diameter of the first air intake orifice 312. The first air intake channel diameter may be equal to or less than the diameter of the first channel 234, the second channel 236, the third channel 238, the fourth channel 244, and the fifth channel 246 (e.g., 8 mm).

Positioning the first air intake channel 310 parallel to the first axis of rotation 202 may deter oil from flowing into the first air intake channel 310 from the first channel 234, as opposed to flowing further down the length of the first channel 234 to the first outlet 214. When the first gear shaft 210 is rotating, a centrifugal load on the oil may push the oil through each of the first channel 234, the second channel 236, and the third channel 238 to the respective outlet, and may prevent oil from flowing through the first air intake channel 310. When the first gear shaft 210 is not rotating, or is rotating at a speed which results in a low centrifugal load, oil may be prevented from flowing into the first air intake channel 310 by the first air intake orifice 312 at the end of the first air intake channel 310 distal from the third intersection 360. Coupling of the first air intake channel 310 to the first channel 234 downstream of the first orifice 254 may thus impose environmental pressure downstream of the first orifice 254 (e.g., for the third length of the first channel 234).

A second air intake channel 320 may be included in the second configuration 300 of the transmission 201 to further reduce pumping effects on the fourth outlet 224. The second air intake channel 320 may be parallel to the second axis of rotation 242 and be coupled to the fourth channel 244 at the fourth intersection 362. The fourth intersection 362 may be downstream (e.g., relative to a direction of lubricant flow through the fourth channel 244) of the fourth orifice 264 and may thus allow air to reach the third length of the fourth channel 244 downstream of the fourth orifice 264.

The second air intake channel 320 may include a second air intake orifice 322 which may have a second air intake orifice length 356 and a second air intake orifice diameter, which may be equal to or different from the first air intake orifice length 352 and the first air intake orifice diameter, respectively. For example, the second air intake orifice diameter may be 0.7 mm when a second air intake channel diameter is 8 mm. The second air intake orifice 322 may be positioned at an air intake channel outlet, axially distal from the fourth intersection 362. The second air intake channel 320 may further have a second air intake channel length 358 downstream of the second air intake orifice 322 relative to air flow into the second air intake orifice 322. The second air intake channel length 358 may have a second air intake channel diameter which is greater than the second air intake orifice diameter of the second air intake orifice 322. The second air intake channel diameter may be equal to or less than the first air intake channel diameter and the diameter of the first channel 234, the second channel 236, the third channel 238, the fourth channel 244, and the fifth channel 246 (e.g., 8 mm).

Positioning the second air intake channel 320 parallel to the second axis of rotation 242 may deter oil from flowing into the second air intake channel 320 from the fourth channel 244, as opposed to flowing further down the length of the fourth channel 244 to the fourth outlet 224. When the second gear shaft 220 is rotating, a centrifugal load on the oil may push the oil through each of the fourth channel 244 and the fifth channel 246 to the respective outlet, and may prevent oil from flowing through the second air intake channel 320. When the second gear shaft 220 is not rotating, or is rotating at a speed which results in a low centrifugal load, oil may be prevented from flowing into the second air intake channel 320 by the second air intake orifice 322 at the end of the second air intake channel 320 distal from the fourth intersection 362. Coupling of the second air intake channel 320 to the fourth channel 244 downstream of the fourth orifice 264 may thus impose environmental pressure downstream of the fourth orifice 264 (e.g., for the third length of the fourth channel 244).

The transmission 201 described in FIG. 3 may be representative of a lubrication system having multiple lubrication channels wherein pumping effects on the lubricant therein is reduced by positioning an orifice of a channel experiencing the greatest centrifugal force of the multiple channels of the system proximate to an axis of rotation, and including an air intake channel to establish environmental pressure downstream of the orifice to further reduce the pumping effect.

FIG. 4 shows a first embodiment 400 of the lubrication system described with reference to the second configuration 300 of FIG. 3 as may be implemented in a lubrication system for a fast-spinning planetary gear set 401. In the first embodiment 400 of FIG. 4, lubrication oil may be supplied to planet bearings of planetary gears.

Oil may enter a first lubrication channel 410 from an oil reservoir (not shown) positioned in a housing 450 via a first lubrication oil distribution orifice 412, as shown by a first arrow 414. The first lubrication channel 410 may be coupled to the housing via rotary seals 416. Air may enter the first lubrication channel 410 via a first air intake orifice 402, thus establishing environmental pressure in the first lubrication channel 410, as shown by a second arrow 418. As described with respect to FIG. 3, air may enter the first lubrication channel 410 downstream of the first lubrication channel orifice (e.g., the first lubrication oil distribution orifice 412), which may reduce a volume of oil flowing out of the first lubrication channel 410 via the first air intake orifice 402. Air and oil may mix in the first lubrication channel 410 and flow towards the planet bearings, as shown by a third arrow 420. The air and oil mixture may flow out of the first lubrication channel 410 to lubricate planetary bearings of the planetary gear set via a first component channel 440, as shown by a fourth arrow 422. In this way, the planetary bearings of a fast-spinning planetary gear set may be lubricated via a lubrication system which may have reduced pumping effect on the oil compared to conventional lubrication systems.

FIG. 5 shows a second embodiment 500 of the lubrication system described with reference to the second configuration 300 of FIG. 3 as may be implemented in a lubrication system for a multi-plate brake 501. Oil may enter a second lubrication channel 510 from an oil reservoir 504 positioned in a housing 550 via a second lubrication oil distribution orifice 512, as shown by a fifth arrow 514. The second lubrication channel 510 may be coupled to the housing 550 via rotary seals 516. Air may enter the second lubrication channel 510 via a second air intake orifice 502, thus establishing environmental pressure in the second lubrication channel 510, as shown by a sixth arrow 518. As described with respect to FIG. 3, air may enter the second lubrication channel 510 downstream of the second lubrication channel orifice (e.g., the second lubrication oil distribution orifice 512), which may reduce a volume of oil flowing out of the second lubrication channel 510 via the second air intake orifice 502. Air and oil may mix in the second lubrication channel 510 and flow towards components of the multi-plate brake, as shown by a seventh arrow 520. The second lubrication channel 510 may be capped off at a radial end by a cap 521, which may prevent oil from flowing to components of the multi-plate brake for which lubrication is not desired. The air and oil mixture may flow out of the second lubrication channel 510 to lubricate components of the multi-plate brake via a component channel outlet 540, as shown by an eighth arrow 522. In this way, fast-spinning components of the multi-plate brake 501 may be lubricated via a lubrication system which may have reduced pumping effect on the oil compared to conventional lubrication systems.

FIG. 6 illustrates a method 600 for lubrication of components on at least one rotating shaft using the lubrication system described herein, such as the lubrication system described with respect to the second configuration 300 of FIG. 3, the first embodiment 400 of the lubrication system for the planetary gear set, and the second embodiment 500 of the lubrication system for the multi-plate brake. The method 600 may describe a flow of air and oil through the lubrication system with respect to the second configuration 300 of FIG. 3.

At 602, the method 600 includes pumping oil into a central lubricant channel of a rotating shaft using a pump. The pump may be a fixed lubrication pump, such as the pump 240, and the central lubricant channel may be the housing channel 232. Oil may be pumped into the central lubricant channel from a sump or other oil reservoir, and may be pumped continuously or solely during operation of the system in which the rotating shaft is integrated.

At 604, the method 600 includes distributing oil among a plurality of channels coupled to the central lubricant channel. The system for which lubrication is desired may include more than one rotating shaft, each with a plurality of channels. For example, a first rotating shaft (e.g., the first gear shaft 210) may include a first plurality of channels and a second rotating shaft (e.g., the second gear shaft 220) may include a second plurality of channels. Each of the first plurality of channels and the second plurality of channels may be coupled to the central lubricant channel via a first branch (e.g., the first branch 232a) and a second branch (e.g., the second branch 232b) of the central lubricant channel. Each of the first branch and the second branch may be positioned axially along an axis of rotation, such as the first axis of rotation 202 and the second axis of rotation 242, respectively, where each of the first axis of rotation and the second axis of rotation are parallel.

As described above, of the plurality of channels on a rotating shaft (e.g., the first plurality of channels on the first rotating shaft or the second plurality of channels on the second rotating shaft), a channel having the greatest radial distance from the respective axis of rotation and/or the greatest rotational speed may experience the greatest centrifugal force and therefore the greatest pumping effect of the plurality of channels. In the herein described example (e.g., as described with reference to FIGS. 3 and 6), a first channel may experience the greatest centrifugal force of the first plurality of channels, and a fourth channel may experience the greatest centrifugal force of the second plurality of channels. Below, the method 600 will be described with reference to the first channel, however "the first channel" may be interpreted in the description of the method 600 as also referring to the fourth channel of FIG. 3 and/or any other channel of a plurality of channels which experiences the greatest centrifugal force.

Distributing oil among the plurality of channels may include flowing oil from the central lubricant channel, into each of the plurality of channels, and out of an outlet of each of the plurality of channels. For channels of the plurality of channels other than the first channel (e.g., channels which experience less centrifugal force than the first channel), the outlet of each channel may have a decreased (e.g., narrowed) diameter relative to a diameter of the channel, as described with respect to FIGS. 2-3.

At 606, the method 600 may include flowing oil through a first orifice of the first channel. As described with respect to FIG. 3, the first orifice may be positioned as close as is possible to the first branch of the central lubricant channel, and therefore the first axis of rotation. For example, a first length of the first orifice may begin at an intersection of the first branch of the central lubricant channel and the first channel, where the first branch and the first channel intersect at a right angle, such that the first channel extends radially from the first branch. In this way, a radial position of the first orifice may be equal to or less than an entering radius of the rotating shaft. Positioning the first orifice proximate to the first axis of rotation may thus reduce pumping effects on the first channel and reduce fluid pumping effect on the oil through the first channel.

At 608, the method 600 includes flowing air into the air intake channel through an air intake orifice. The air intake channel may be positioned downstream of the first orifice and parallel to the first axis of rotation, such that the air intake channel perpendicularly intersects the first channel, and the first channel and the air intake channel are in fluidic communication. The air intake channel may have an air intake orifice positioned on an opposite end of the air intake channel (e.g., distal) from the intersection with the first channel. The air intake channel may have an air intake channel length and an air intake channel diameter. The air intake orifice may have an air intake orifice length and an air intake orifice diameter, as described with respect to FIG. 3. The air intake channel diameter may be greater than the air intake orifice diameter, such that air enters the air intake channel via a small diameter of the air intake orifice and travels along the air intake channel through a larger diameter.

At 610, the method 600 includes mixing air and oil in the first channel downstream of the first orifice. Mixing air and oil may establish environmental pressure may be established downstream of the first orifice in the first channel, thus reducing pumping effects on the first channel and reducing oil flow into the air intake channel when the rotating shaft is stationary and/or rotating.

At 612, the method 600 may include flowing mixed air and oil out of the first channel at a first outlet to lubricate a first component coupled to the first outlet. The first component may be at least one of a bearing, gear, multiplate clutch, and components of an electromotor.

The above description relates to systems and methods for lubricating components of a high speed and/or high diameter shaft. A lubrication system and method described herein may include at least one rotating shaft having a plurality of outlets, wherein each of the plurality of outlets is coupled to a component for which lubrication is desired. Each outlet of the plurality of outlets is coupled to a central lubricant channel via a respective channel. Each of the plurality of outlets may experience a different centrifugal load, depending on a radial distance of the outlet from a rotational axis of the rotating shaft (e.g., an exit radius), and thus a rotational speed of the outlet, and an entering radius of the respective shaft in which the outlet is positioned. A pumping effect may occur when a fixed pump with a constant flow rate pumps lubricant through a plurality of channels (e.g., the respective channels coupled to each of the plurality of outlets) having different diameters and rotational speeds. A larger pumping effect on a channel (e.g., a channel having the greatest difference between exit radius and respective entering radius, such as the first channel 234 or the fourth channel 244) may lead to a larger flow rate in that channel when rotational speed of the respective shaft is increased. This may decrease the flow rate in other channels coupled to the same pump and/or in the same shaft, when the pump provides a constant flow, such as a volumetric pump at a fixed speed. When the volumetric pump is implemented, the overall flow rate of the system may remain the same and distribution of oil flow among the multiple channels may change with the rotational speed of the respective shaft. Thus, the pumping effect within each of the multiple channels may be different.

It may be desirable to increase the flow rate of the constant pump to provide sufficient lubrication to respective components of each channel which is not experiencing an increased pumping effect. However, if the desired increase in flow rate exceeds the flow rate attainable by the pump with which the lubrication system is configured, a larger pump may be desired to mitigate the discrepancy in flow rate demand. Modification of the lubrication system to include a larger pump may increase a footprint (e.g., a sump volume) of the lubrication system and decrease efficiency of the lubrication system.

As an alternate solution to implementing a pump with capacity to provide a greater pump flow rate, the pumping effect may be reduced, and thus efficiency of the lubrication system may be increased, by configuring the at least one rotating shaft with a first channel, which couples a first outlet to the housing channel. The first channel is configured with an orifice which reduces a channel diameter to an orifice diameter for a length of the orifice. The first orifice may be positioned such that the respective exit radius (e.g., a radius of the respective shaft at the radial position of the first orifice) is as close to the entering radius as possible (e.g., is proximate to the first branch of the housing channel) while being positioned radially on the first channel. The first outlet may experience the largest centrifugal load of centrifugal loads experienced by the plurality of outlets due to being a greatest radial distance from the rotational axis of the rotational shaft, and thus having a greatest rotational speed of the plurality of outlets.

Further, the rotating shaft may include an air intake channel parallel to the housing channel and coupled to the first channel. The first length of the first channel may be a length of the first orifice, which is positioned in a region of the first channel between an intersection of the respective branch of the housing channel and the first channel, and an intersection of the air intake channel and the first channel. The third length of the first channel may be the remaining length of the first channel between the intersection of the air intake channel and the first channel and the first outlet.

Thus, outlets positioned the furthest radial distance from the rotational axis and/or having the greatest rotational speed may experience a reduced pumping effect when having an outlet positioned proximate to the rotational axis of the rotating shaft and being coupled to the air intake channel. In this way, the plurality of components may be provided with a desired amount of lubrication when a fixed lubrication pump is used.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for a lubrication system for a rotating shaft, comprising: a pump coupled to a central lubricant channel, wherein the rotating shaft has a plurality of channels, an air intake channel positioned parallel to an axis of rotation of the rotating shaft, and a first orifice of a first channel of the plurality of channels, where the first orifice is positioned between the air intake channel and the central lubricant channel. In a first example of the system, an entering radius of the rotating shaft for the first channel is approximately equal to an exit radius of the rotating shaft for the first channel. In a second example of the system, optionally including the first example, the first orifice has an orifice diameter which is less than a channel diameter of the first channel. In a third example of the system, optionally including one or both of the first and second examples, the air intake channel is coupled to the first channel downstream of the first orifice in a direction of oil flow through the first channel. In a fourth example of the system, optionally including one or more or each of the first through third examples, the air intake channel has an air intake channel diameter proximate to the first channel and an air intake orifice proximate to an air intake channel outlet, where an air intake orifice diameter is less than the air intake channel diameter. In a fifth example of the system, optionally including one or more or each of the first through fourth examples, the central lubricant channel is positioned axially along the axis of rotation and the first channel extends radially from the central lubricant channel.

The disclosure also provides support for a system, comprising: a plurality of rotating shafts, wherein each of the plurality of rotating shafts has at least two channels, an air intake channel positioned parallel to a housing channel of a rotating shaft and coupled to a first channel of the at least two channels, wherein the first channel has a first orifice positioned thereon between the air intake channel and the housing channel, such that an exit radius of the rotating shaft at a first axial position of the first orifice is approximately equal to an entering radius of the rotating shaft at a second axial position of a first end of the housing channel. In a first example of the system, a first outlet of the first channel is positioned a greater radial distance from the housing channel relative to a second outlet of a second channel of the at least two channels. In a second example of the system, optionally including the first example, each of the at least two channels have a different centrifugal load applied thereto and wherein a centrifugal load increases as a difference between the entering radius and the exit radius of the rotating shaft for each of the at least two channels increases and as a rotational speed of each of the at least two channels increases. In a third example of the system, optionally including one or both of the first and second examples, channels of the at least two channels which have lesser centrifugal loads than the first channel have an orifice proximate to an outlet of the respective channel, and wherein a channel diameter is greater than a respective orifice diameter. In a fourth example of the system, optionally including one or more or each of the first through third examples, the first orifice has an orifice diameter which is less than a channel diameter of the first channel. In a fifth example of the system, optionally including one or more or each of the first through fourth examples, the air intake channel has an air intake orifice diameter at an air intake orifice and an air intake channel diameter along an air intake channel length, wherein the air intake channel diameter is greater than air intake orifice diameter.

The disclosure also provides support for a method for a lubrication system, comprising pumping oil into a housing channel of a rotating shaft using a pump, distributing oil among a plurality of channels coupled to the housing channel, flowing oil through a first orifice of a first channel, flowing air into an air intake channel via an air intake orifice, mixing air and oil in the first channel downstream of the first orifice of the first channel in a direction of oil flow, and flowing an air and oil mixture out of the first channel at a first outlet to lubricate a first component coupled to the first outlet. In a first example of the method, oil is distributed among a first plurality of channels of a first rotating shaft via a first branch of the housing channel and among a second plurality of channels in a second rotating shaft via a second branch of the housing channel. In a second example of the method, optionally including the first example, each of the first branch and the second branch are positioned axially along a first axis of rotation and a second axis of rotation, respectively, where the first axis of rotation and the second axis of rotation are parallel. In a third example of the method, optionally including one or both of the first and second examples, the first channel has a greatest centrifugal force applied thereto of the plurality of channels. In a fourth example of the method, optionally including one or more or each of the first through third examples, the first orifice has a first length and an orifice diameter and is positioned upstream of a third length of the first channel, which has a channel diameter. In a fifth example of the method, optionally including one or more or each of the first through fourth examples, the air intake channel is parallel to the housing channel. In a sixth example of the method, optionally including one or more or each of the first through fifth examples, the air intake orifice has an air intake orifice length and an air intake orifice diameter. In a seventh example of the method, optionally including one or more or each of the first through sixth examples, the air intake channel has an air intake channel length downstream of the air intake orifice in a direction of air flow, where the air intake channel length has an air intake channel diameter greater than the air intake orifice diameter of the air intake orifice.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a lubrication system, comprising:
pumping oil into a housing channel of a rotating shaft using a pump;
distributing oil among a plurality of channels coupled to the housing channel;
flowing oil through a first orifice of a first channel;
flowing air into an air intake channel via an air intake orifice;
mixing air and oil in the first channel downstream of the first orifice of the first channel in a direction of oil flow; and
flowing an air and oil mixture out of the first channel at a first outlet to lubricate a first component coupled to the first outlet.

2. The method of claim 1, wherein the plurality of channels includes a first plurality of channels of a first rotating shaft and a second plurality of channels of a second rotating shaft, and wherein oil is distributed among the first plurality of channels via a first branch of the housing channel and among the second plurality of channels via a second branch of the housing channel.

3. The method of claim 2, wherein each of the first branch and the second branch is positioned axially along a first axis of rotation and a second axis of rotation, respectively, and wherein the first axis of rotation and the second axis of rotation are parallel.

4. The method of claim 1, wherein the first channel of the plurality of channels is positioned furthest from the rotational shaft.

5. The method of claim 1, wherein the first orifice has a first length and an orifice diameter and is positioned upstream of a third length of the first channel, which has a channel diameter.

6. The method of claim 1, wherein the air intake channel is parallel to the housing channel.

7. The method of claim 6, wherein the air intake orifice has an air intake orifice length and an air intake orifice diameter.

8. The method of claim 7, wherein the air intake channel has an air intake channel length downstream of the air intake orifice in a direction of air flow, and wherein the air intake channel length has an air intake channel diameter greater than the air intake orifice diameter of the air intake orifice.

* * * * *